United States Patent Office 3,430,872
Patented Mar. 4, 1969

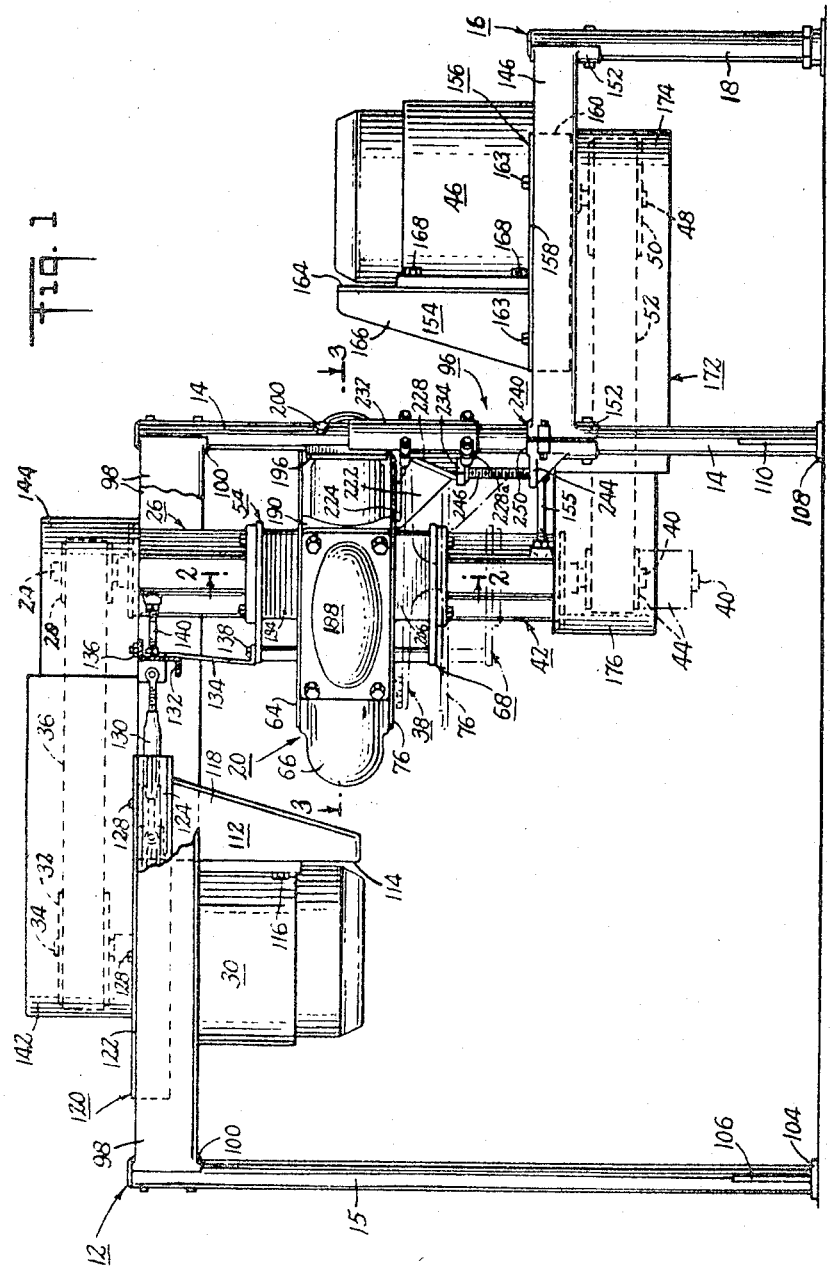

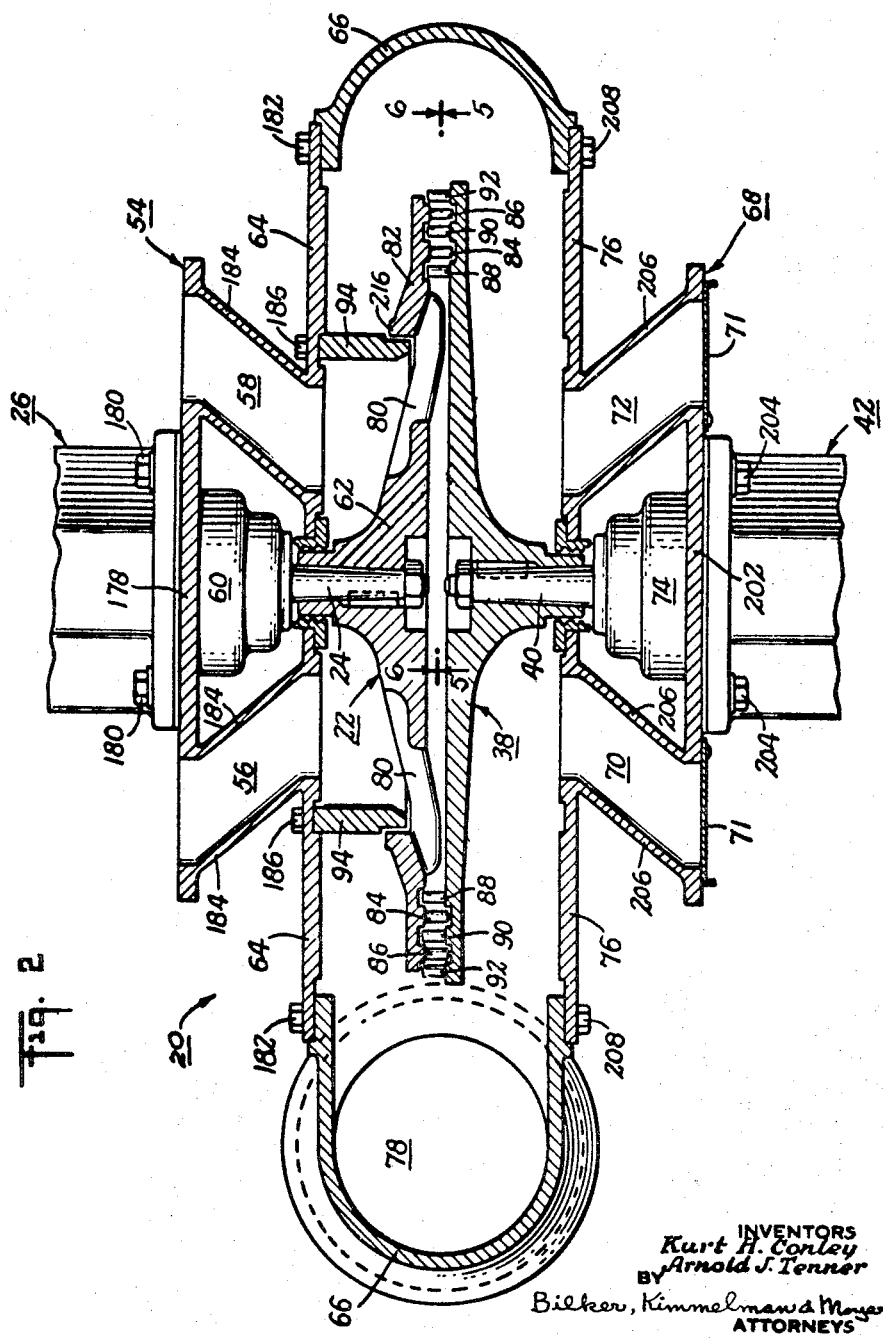

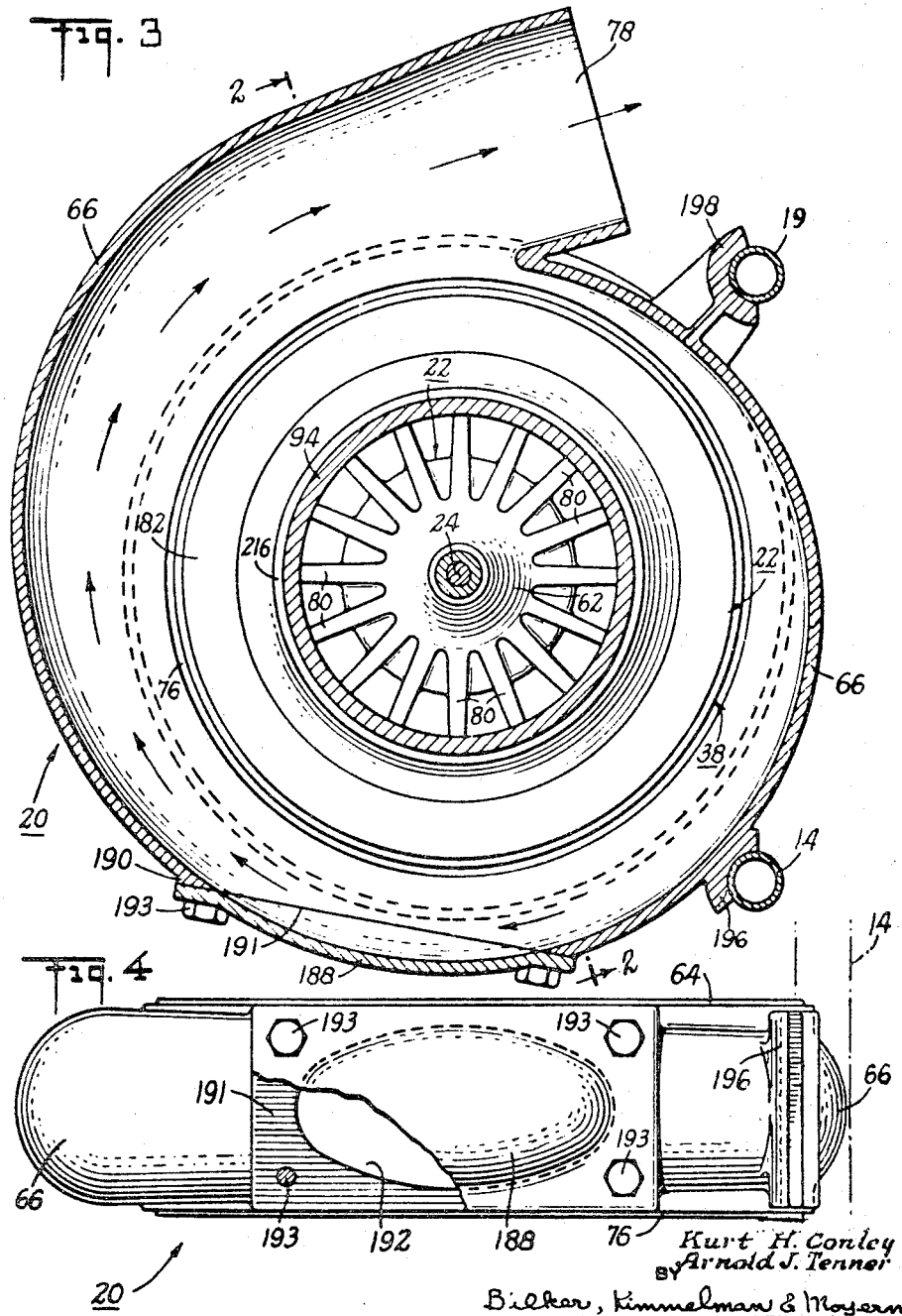

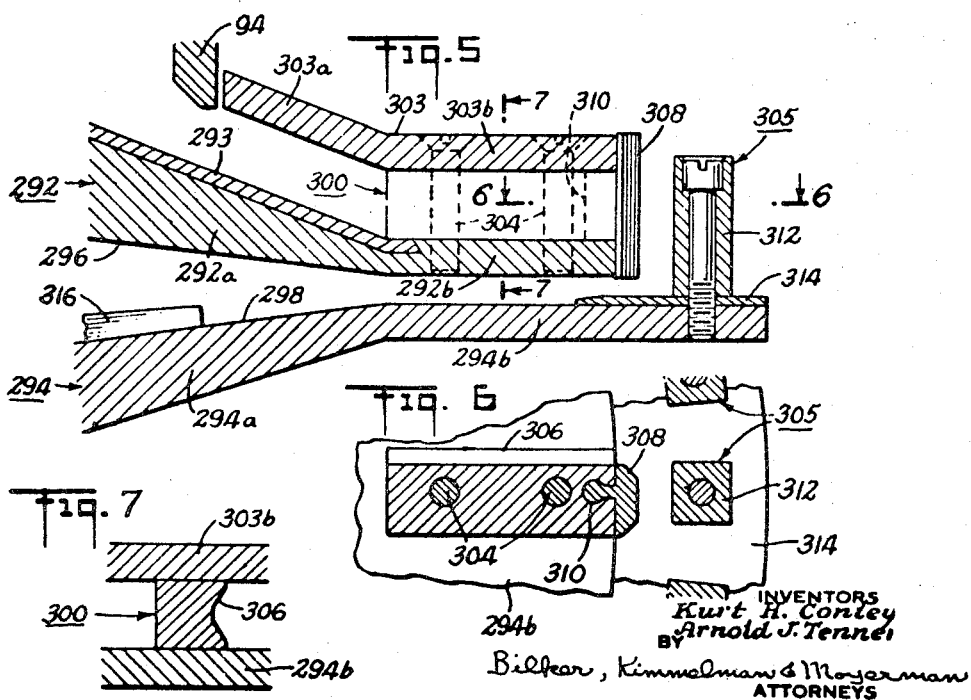

3,430,872
CENTRIFUGAL IMPACTING APPARATUS
Kurt H. Conley, Hamden, and Arnold J. Tenner, West Haven, Conn., assignors, by mesne assignments, to Entoleter, Inc., a corporation of Delaware
Application Nov. 24, 1961, Ser. No. 160,966, now Patent No. 3,229,923, dated Jan. 18, 1966, which is a division of application Ser. No. 799,930, Mar. 17, 1959, now Patent No. 3,023,973, dated Mar. 6, 1962. Divided and this application Oct. 6, 1965, Ser. No. 511,006
U.S. Cl. 241—55                    2 Claims
Int. Cl. B02c 9/04, 11/00, 13/20

ABSTRACT OF THE DISCLOSURE

A centrifugal impacting mill has an upper or receiving rotor with impactors located toward the periphery thereof. A second processing rotor is positioned below the first rotor and has a number of impacting elements extending upwardly therefrom. The rotors are formed with concave adjacent faces to form an air inlet space between them. The space diminishes from the center of the rotors outwardly and may be designed to produce a venturi effect upon the air passing through this passage. Fan blades are mounted on the upper surface of the second rotor. The first or upper rotor has a plurality of radially disposed impacting elements located in an outward annular region just below a downwardly sloping portion on which the material to be milled is received. The leading surfaces of these impactors may be grooved to direct the treated material toward the central portion of the impactors of the second rotor.

---

This application is a division of our co-pending application Ser. No. 160,966 filed Nov. 24, 1961, now Patent No. 3,229,923 issued Jan. 18, 1966, which is in turn a division of Ser. No. 799,930, filed Mar. 17, 1959, now Patent No. 3,023,973 issued Mar. 6, 1959.

This invention relates to apparatus for centrifugally impacting a flowing product to break and reduce the individual particles of the product. This apparatus may be used successfully in the milling of flour or other products from wheat, rye, corn, potatoes, tapioca or other grown products requiring extraction or separation of ingredients or fractions thereof. It may also be used for the reduction of certain inert materials such as asbestos, plasters, and the like. This apparatus may likewise be used for reducing, mixing, blending and otherwise processing a wide variety of materials.

With conventional single rotor centrifugal impacting apparatus, operational impacting speeds and capacities are quite limited. Centrifugal impacting apparatus incorporating two counter-rotating rotors with cooperating impactor elements produces better impacting results, because of the higher relative impacting velocities and capacities thereby made possible. But the mounting and alignment of the coacting rotors must be very precise to provide proper cooperation between the impactor elements and to prevent bridging or clogging of impacted material therebetween. Furthermore, the supporting frame must be adapted to withstand static loads, dynamic stresses and torque loads, such as those introduced by uneven inflow of the granular materials to be treated, and the necessary alignment must still be maintained.

Accordingly, the principal object of the present invention is to provide economical centrifugal impacting apparatus affording greatly improved impacting action. Another object of the invention is to provide apparatus of the above character incorporating two cooperating rotors driven by separate drive systems mounted on a unitary supporting frame. Another object of the invention is to provide apparatus of the above character affording a selectable plurality of discharge paths for the material treated to facilitate the combining of the apparatus with other equipment in a continuous treatment installation. Another object of the invention is to provide apparatus of the above character adapted to accommodate a variety of differently shaped impacting rotors for purposes of treating different types of materials. Other objects will be in part obvious and in part pointed out hereinafter.

The invention accordingly comprises the apparatus embodying features of construction, combinations of elements and arrangements of parts which will be exemplified in the construction hereinafter set forth, and the scope of the invention will be indicated in the claims.

For a fuller understanding of the nature and objects of the invention, reference should be had to the following detailed description taken in connection with the accompanying drawings, in which:

FIGURE 1 is a side elevation view, partially cut away, of impact milling apparatus incorporating one embodiment of the present invention;

FIGURE 2 is a fragmentary sectional elevation of a portion of the apparatus shown in FIGURE 1, and taken along the line 2—2, in FIGURES 1 and 4;

FIGURE 3 is a sectional top plan view of the central portion of the apparatus shown in FIGURE 1, and taken along the line 3—3;

FIGURE 4 is an elevation view, partially cut away, of the portion of the apparatus shown in FIGURE 3;

FIGURE 5 is a fragmentary vertical section of the rotors according to the present invention;

FIGURE 6 is a fragmentary horizontal sectional view taken along line 6—6 of FIGURE 5; and FIGURE 7 is a fragmentary vertical section taken along line 7—7 of FIGURE 5.

Referring now to the drawings in detail, there is shown in FIGURE 1 a supporting frame generally indicated at 12 incorporating supporting posts generally indicated at 14 and 15, a sub-frame generally indicated at 16, supported on legs one of which is generally indicated at 18. A rotor housing generally indicated at 20 is supported by two parallel central posts one of which is indicated at numeral 14 and by frame 12.

Referring to FIGURE 2, showing an enlarged sectional view of rotor housing 20, a receiving rotor generally indicated at 22 is keyed to a drive shaft generally indicated at 24, and shaft 24 extends through a suitable series of journal bearings (not shown) in a bearing casing generally indicated at 26. As best seen in FIGURE 1, a pulley generally indicated at 28 is keyed to the upper end of shaft 24, and frame 12 supports a driving motor 30 having a pulley 32 keyed to its drive shaft 34 as will be described in greater detail hereafter. Pulleys 28 and 32 are drivingly connected by suitable belting 36.

Returning to FIGURE 2, a processing rotor generally indicated at 38 is keyed to a shaft 40 which extends downwardly through suitable journal bearings (not shown) in a lower bearing casing generally indicated at 42. A pulley 44 is keyed to the lower end of shaft 40 as best seen in FIGURE 1, and sub-frame 16 supports a driving motor 46 whose shaft 48 has a pulley 50 keyed thereto. Suitable belting generally indicated at 52 drivingly connects pulleys 44 and 50. Preferably motors 30 and 46 are constructed to drive the receiving and processing rotors 22 and 38 in opposite directions.

Again referring to FIGURE 2, it will be seen that the rotor housing comprises an upper inlet casing generally indicated at 54 which includes inlet chutes 56 and 58 disposed on the opposite sides of the lower portion 60 of bearing casing 26 and converging toward the central portion or hub 62 of the receiving rotor 22. Inlet casing 54 also includes a housing plate 64 which rests upon and is secured to a volute central section 66 of housing 20. A lower air inlet casing generally indicated at 68 includes air inlet chutes 70 and 72 similarly located with respect to the upper portion 74 of bearing casing 42. Lower inlet casing 68 also includes a housing plate 76 secured to volute section 66 in any suitable manner. The shape of the volute central section 66 may be comprehended by reference to FIGURE 3 where it will be seen to increase gradually in radial dimension to form the product outlet 78; outlet 78 may be connected to any suitable ducting (not shown) for conveying the processed material away from the machine.

Referring to FIGURE 2, the rotors 22 and 38 are not part of the present invention, having been treated in previous Patents 3,023,973 and 3,229,923 which derive from the original application of which this is a second divisional case. The rotors shown in FIGS. 5, 6 and 7 do constitute the novel portion of the present invention and will be treated in some detail later. These figures are included merely to illustrate the environment in which the rotors of the apparatus are located. It will be seen that receiving rotor 22 has a series of radially extending vanes 80 running between hub 62 and the outer ring portion 82 thereof. Rotor 38 merely comprises a substantially flat disc and the outer portions of the two rotors face each other and have extending therefrom a series of impactors. More particularly, receiving rotor 22 has two rows of impactors 84 and 86 extending downwardly therefrom while processing rotor 38 has impactors 88, 90 and 92 extending upwardly therefrom, as shown in FIGURES 3, 8, 9 and 10. As will be apparent in FIGURE 2, impactors 84 and 86 are disposed between impactors 88, 90 and 92. Also, it is to be noted that the space between the impactors, indeed all spaces through which the material being processed travels, should be larger than the individual particles being processed so that the action of the machine is one of pure impact as distinguished from a grinding or mashing action.

Supporting means for motor 46 and the associated driving mechanism for processing rotor 38 (FIGURE 2) are shown in FIGURE 1. Sub-frame 16 comprises side members, end member and central crosspiece. The ends of side members 146 are provided with end sockets 152 to accommodate legs 18 and 21 and central posts 14 and 19, and the legs and posts may be held in position in these sockets by welding or bolting as described above with respect to the main frame 12. The end member and central crosspiece span the width of sub-frame 16 and join the ends of side members 146 adjacent end sockets 152. A lower motor bracket generally indicated at 154 includes angle members 156 having upper horizontal flanges 158 slidably resting upon the upper surfaces of side members 146 with depending inner vertical flanges 160 positioned inside and adjacent their respective side members 146. The upper flanges 158 of these angle members are provided with longitudinal slots (not shown) adapted to receive bolts 163 which are inserted therethrough into tapped holes in side members 146. Motor mounting plate 164 spans sub-frame 16 between angle members 156 and is provided with longitudinal flanges 166 welded to depending flanges (not shown) of angle members 156. Motor 46 is bolted or otherwise secured to mounting plate 164 by bolts 168.

A pair of longitudinal torque braces 155 connect the lower bearing casing 42 to the central crosspiece of sub-frame 16.

As described above, shaft 40, on which processing rotor 38 is mounted, projects from the lower end of lower bearing casing 42 and pulley 44 is keyed on this lower projecting end of shaft 40. A pulley 50 is keyed to the downwardly projecting shaft 48 of motor 46 and flexible belting 52 joins the two pulleys to complete the driving connection between motor 46 and the processing rotor 38. Belting 52 preferably take the form of a plurality of flexible belts joining multigrooved pulleys 44 and 50, and optimum belt tension is maintained by the sliding motor bracket adjustment described above. The torque braces 155 aid in maintaining bearing casing 42 in position. These belts and pulleys are guarded by a second telescoping drive cover generally indicated at 172, which includes an open-ended belt cover 174 covering pulley 50 and a portion of belts 52 and secured to motor bracket 154, and an interfitting pulley cover 176 covering pulley 44 and the remainder of belts 52 which is secured to lower bearing casing 42.

Referring now to FIGURE 2, it will be seen that the preferred form of rotor casing 20 includes three separate elements which are connected by bolts, or the like: upper inlet casing 54, lower air inlet casing 68 and volute housing section 66.

Upper inlet casing 54 includes a base plate 178 bolted to upper bearing casing 26 by bolts 180, and a housing plate 64 joined to base plate 178 by the side walls 184 of inlet chutes 56 and 58. Base plate 178 and housing plate 64 are provided with suitable openings to accommodate the projecting lower portion 60 of bearing casing 26 and shaft 24 and its associated fittings, respectively. Feed chutes 56 and 58 preferably converge, as shown in FIGURE 2, to direct the inflowing material to be treated toward central hub 62 of receiving rotor 22. Annular collar 94 is secured by bolts 186 to the underside of housing plate 64 in such a position that the collar fits within the rim or ring portion 82 of receiving rotor 22.

Rotor housing section 66, as shown in FIGURES 2 and 3, comprises a generally annular housing of volute horizontal cross-section, with a discharge outlet 78, at its periphery. Volute section 66 surrounds rotors 22 and 38 and is bolted to housing plate 64 of inlet casing 54 by bolts 182.

Volute housing 66 is provided with an access door 188 mounted on its periphery, as shown in FIGURES 3 and 4. A peripheral portion of volute housing 66 extends radially to form a projecting door flange 190 with a flat outer face 191. The door flange 190 surrounds a generally elliptical door opening 192 affording access to the interior of volute housing 66 (FIGURE 4). Door 188 is connected to face 191 of flange 190 by bolts 193, threaded into tapped holes in face 191, or by other suitable fastening means. If desired, door 188 may be hinge connected to flange 190, and closed by a suitable latch arrangement (not shown in the drawings). Anchor brackets 196 and 198 are formed on or joined to the periphery of volute 66 and adapted to accommodate central posts 14 and 19, respectively, these brackets being held in position by bolts 200 passing through suitable holes in the posts and thence into tapped holes in the anchor bracket. Volute rotor casing 66 is thus firmly anchored to the posts supporting the main frame. It will be seen in FIGURE 3 that anchor bracket 198 projects farther from the outer wall of volute 66 than does bracket 196 because the volute has a smaller external radius at anchor bracket 198 than at anchor bracket 196.

The arrows in FIGURE 3 indicate generally the path of air and treated material leaving the rotors and passing around the interior of the volute toward discharge outlet 78. Feed chutes 56 and 58, shown in detail in FIGURE 2, may be connected to suitable ducting, adapted to convey air and the material being treated to the apparatus, and discharge outlet 78 may likewise be connected to similar ducting to convey the impacted material to further treatment operations.

Rotor housing 20 also includes air inlet casing 68 as shown in FIGURE 2, and this inlet casing, like inlet casing 54, includes a base plate 202 secured by bolts 204 to lower bearing casing 42, and joined to the housing plate 76 by the walls 206 of air inlet chutes 70 and 72. Air inlet casing 68 is joined by bolts 208 to volute rotor casing 66, and both base plate 202 and housing plate 76 provide apertures accommodating projecting upper portion 74 of lower bearing casing 42 and shaft 40 and its associated fittings, respectively.

As indicated in FIGURE 2, inlet casing 54 and air inlet casing 68 are preferably identical and may be interchanged, one for the other, to provide an extended useful life for the apparatus. Manufacturing costs are also reduced by employing the same structure to form both the upper and lower portions of rotor housing 20. Furthermore, volute casing 66 is preferably designed so that it may be reversed and installed upside down to place discharge outlet 78 in an alternative position B on the opposite side of the structure, for convenience in adapting the apparatus to be linked and installed with adjacent processing machinery in the most useful and space-saving manner.

The operation of the machine will be understood by referring to the various figures. Motors 30 and 46 are started and the upper and lower rotors are thereby driven at high speeds, preferably in opposite directions. Granular or fibrous material of any desired particle size is then introduced to the apparatus through feed chutes 56 and 58, together with air or any other desired gases. The moisture content of the accompanying air or gases may be regulated to facilitate the impacting operation. Material to be impacted is directed by feed chutes 56 and 58 to the hub of the upper rotor, where it is flung outwardly under the impetus of centrifugal force toward collar 94. The material is thus driven at high velocity to the impactors, and is violently flung and impacted therebetween, the material passing at all times through spaces between the various elements which are larger than the particle size of the material being treated, so that bridging and clogging of treated material in the impacting area is minimized or eliminated. The impacted stock and the air admitted therewith, as well as any additional air admitted through air inlet passages 70 and 72, thereafter travels around the interior of the volute 66 as described above and passes therefrom through discharge outlet 78. Air inlet valves 71 are pivotally mounted in inlet passages 70 and 72 to control the amount of additional air admitted therethrough.

It will be seen from the foregoing discussion that all of the elements supporting and anchoring the rotor housing and bearing casings to the main frame and the subframe cooperate to resist both static loads and dynamic stresses with great efficiency. Anchor brackets 196 and 198 are well adapted to anchor rotor housing 20 to central posts 14 and thereby maintain proper operating alignment of the two rotors.

The pair of upper and lower rotors which forms another embodiment of our invention is illustrated in FIGURES 5, 6 and 7. Here, the receiving rotor 292 and the processing rotor 294 are not flat, but are formed with concave adjacent faces 296 and 298, respectively, to form an air inlet space between them having a vertically diminishing thickness, which may be designed to produce a venturi effect upon the air passing through this air inlet passage. Fan blades 316 are mounted on surface 298 of rotor 294. The receiving rotor 292 has a lower plate with a downwardly sloping central portion 292a on which a abrasion resistant wear plate 293 is mounted, and an outer substantially horizontal portion 292b. The receiving rotor also includes an upper ring 303 having a downwardly sloping inner portion 303a surrounding collar 94, and a substantially horizontal outer portion 303b immediately above portion 292b.

The receiving impactor elements 300 are radially disposed between horizontal portions 292b and 303b, and impactor elements 300 preferably extend from sloping portions 292a and 303a to the periphery of the rotor. These impactors 300 preferably take the form of solid blocks held in position by screws 304, and having generally concave radial grooves 306 formed in their leading edges, i.e., in the faces which strike the material to be treated. These grooves channel and direct the treated material toward the central portion of the processing impactors 305, to provide more efficient impacting action.

Processing rotor 294 has an upwardly sloping central portion 294a, and a horizontal portion 294b, with a row of radially spaced impactors 305 extending upwardly therefrom adjacent its periphery. The impactors 305 and the processing rotor 294 may be provided with abrasive-resistant surfaces 312 and 314 in the manner shown in FIGURE 5. If desired, the impactors 305 may take the form of square or polygonal pins. The outer ends of impactors 300 are also provided with abrasive-resistant inserts 308 keyed into suitable end slots 310 in the impactors; these inserts extend vertically so that the inserts cover the outer ends of the impactors and the peripheries of plate 292 and ring 303. Inserts 308 are thus well adapted to cooperate with impactors 305 to provide rebound or ricochet impacting effect.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

We claim:

1. In centrifugal impacting apparatus, the combination of a casing, a horizontal receiving rotor rotatably mounted in said casing and having circumferentially-spaced impactors mounted thereon in a circular row substantially spaced from the axis of the rotor, said impactors being elongated solid blocks whose axes are substantially radially disposed, each of said blocks having a substantially radial groove formed in its leading face, a horizontal processing rotor rotatably mounted in said casing and having a row of impactors extending upwardly therefrom and outwardly spaced from said first-mentioned impactors, said receiving rotor having a downwardly-sloping surface adapted to guide the material to be impacted outwardly under the influence of gravity and centrifugal force, whereby upon rotation of said rotors material fed to said receiving rotor is hurled outwardly and impacted by said impactors.

2. In centrifugal impacting apparatus, the combination of a casing, a horizontal receiving rotor rotatably mounted in said casing and having circumferentially-spaced impactors mounted thereon in a circular row substantially spaced from the axis of the rotor, a horizontal processing rotor rotatably mounted in said casing and having a row of impactors extending upwardly therefrom and outwardly spaced from said first-mentioned impactors, the adjacent faces of said rotors being spaced apart and being respectively shaped to form a space between them which is an air intake passage having a venturi effect, said space gradually diminishing from the axis of said rotors to the peripheries thereof, said processing rotor being provided with means forming air intake openings through which air may be drawn into said passage, said receiving rotor having a downwardly-sloping surface to guide the material to be impacted outwardly under the impetus of gravity and centrifugal force, whereby upon rotation of said rotors material fed to said receiving rotor is hurled outwardly and is impacted by said impactors.

(References on following page)

References Cited

UNITED STATES PATENTS

| | | | |
|---|---|---|---|
| 1,724,895 | 8/1929 | Beach | 241—188.5 X |
| 1,731,649 | 10/1929 | Daniels | 241—186 |
| 1,885,251 | 11/1932 | Gaiser | 241—188.5 |
| 1,947,953 | 2/1934 | Otto | 241—188.5 |
| 2,623,700 | 12/1952 | Scherer | 241—188 |
| 2,428,670 | 10/1947 | Hulse | 241—261 X |
| 2,628,038 | 2/1953 | Rogers et al. | 241—300 |

FOREIGN PATENTS 122,664   1958   Russia.

ANDREW R. JUHASZ, *Primary Examiner.*

U.S. Cl. X.R.

241—261, 300